Nov. 25, 1969    R. J. UNKEFER    3,480,140
TESTING AND SORTING APPARATUS FOR BATTERIES
Filed March 24, 1967    2 Sheets-Sheet 1

INVENTOR.
ROBERT J. UNKEFER
BY
George C. Sullivan
Agent

Nov. 25, 1969  R. J. UNKEFER  3,480,140
TESTING AND SORTING APPARATUS FOR BATTERIES
Filed March 24, 1967  2 Sheets-Sheet 2

INVENTOR.
ROBERT J. UNKEFER
BY
George C. Sullivan
Agent

United States Patent Office 3,480,140
Patented Nov. 25, 1969

3,480,140
TESTING AND SORTING APPARATUS FOR BATTERIES
Robert J. Unkefer, Sherman Oaks, Calif., assignor to Lockheed Aircraft Corporation, Burbank, Calif.
Filed Mar. 24, 1967, Ser. No. 625,648
Int. Cl. B07c 3/12, 5/344
U.S. Cl. 209—73                                         14 Claims

ABSTRACT OF THE DISCLOSURE

An apparatus for automatically testing batteries by subjecting them to a potentiometer-controlled circuit to determine their residual life, using the battery as part of the circuit, and to activate a sorter to separate the batteries in accordance with the residual life determination.

Background of the invention

Tremendous numbers of electrical batteries are regularly used by industry, utilities, municipalities, etc., particularly batteries of the flashlight variety. Large quantities of such batteries are often used by a single company, so that an annual supply represents a large economic investment.

Normally, used flashlight batteries are discarded and no attempt is made to salvage questionable or rechargeable units. Nevertheless, it has been found that many of these used and discarded flashlight batteries have a considerable residual life. Consequently, industry has need for a means to test and conserve them. Economics dictates, however, that this must be done without the employment of extensive checking and sorting procedures which would offset the cost of conservation.

Summary of the invention

The present invention provides an apparatus for automatically testing and sorting batteries. It rejects those having less than a predetermined voltage level representing a known residual life. The apparatus is adapted to receive a continuous line of batteries, test the cells, and discharge them at the test station so that the cells which test above the predetermined test voltage are separated from those which test below the established level. Further provision is made for sorting batteries which are rechargeable from those which fail to meet the test voltage level.

In general, the invention provides a conveyor for supplying a battery cell to a testing apparatus wherein the battery cell is disposed upon a bridged discontinuity on the track. The battery cell supported on the bridged discontinuity becomes part of an electrical circuit which tests the cell voltage level. A potentiometer is included in the circuit to assure that if the voltage level is above a predetermined value, an electromagnet is energized. This causes a solenoid release mechanism to release the bridge so that the weight of the cell on the bridge causes it to open, thereby facilitating its separation from the other cells awaiting test.

Therefore, it is a primary object of the present invention to automatically test battery cells for acceptable voltage levels and reject those batteries which do not meet the predetermined voltage level.

Another object of the present invention is to provide an automatic apparatus in which a supply of battery cells or similar devices will be fed in sequence to a testing station, and selectively discharged from the test station in accordance with the test findings.

Still another object of the present invention is to provide a novel battery cell testing apparatus which employs a step-by-step mechanism for controlling the movement of a plurality of battery cells arranged in a series on an automatic feeding mechanism wherein the feeding mechanism automatically supplies a single battery cell to a test position after each testing operation.

Another object of the present invention is to provide a locking bar operating in conjunction with a hinged trap for selectively holding a battery cell in the test position and including an electromagnetic control for actuating the locking bar in response to a control signal generated during the cell testing procedure.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing.

Detailed description

Figure 1:
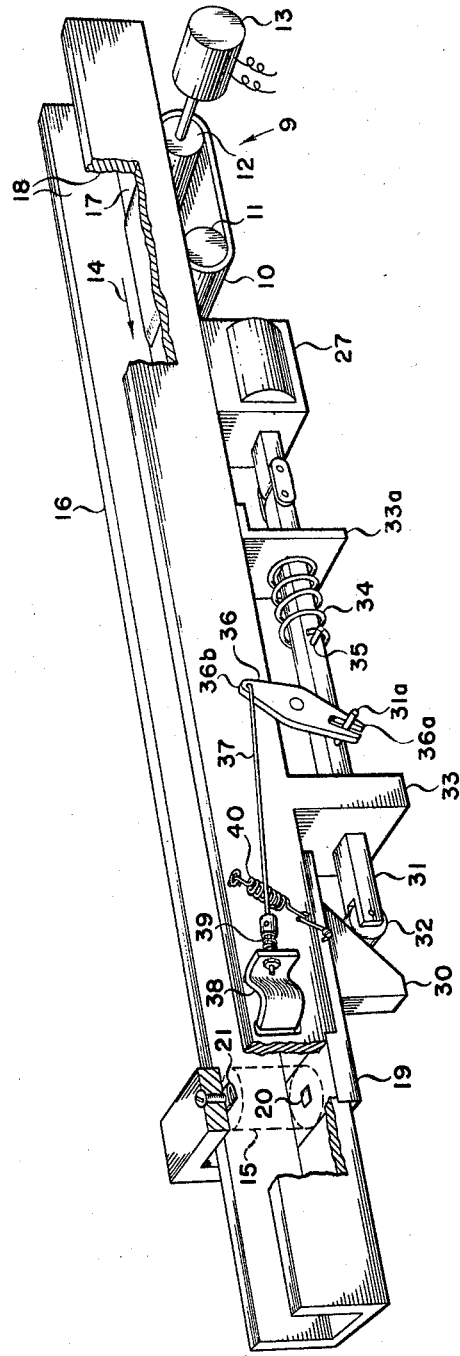
FIGURE 1 is a perspective view of the invention partially cut away to show a conveyor means.

Referring to the drawing, a conveyor means which is preferably, but not mandatorily, provided as a portion of the invention, is identified by numeral 9. In the present instance the conveyor is an endless belt 10 extending around a pair of sprockets 11 and 12, the sprocket 11 being driven by any suitable means, such as motor 13, so that it rotates in the direction shown by arrow 14.

A plurality of battery cells 15 of the flashlight variety, are arranged on the conveyor means in a series wherein each cell is preferably in an upright position. While the conveyor 9 has been shown extending along only a portion of the apparatus, it will be obvious to one skilled in the art to extend the conveyor along the entire length of the apparatus or, in the alternative, to substitute a pusher rod or other means for causing a single battery cell or a plurality of cells to be moved along the length of the apparatus. The sides and bottom of elongated channel member 16 defines a track or path, a portion of the conveyor belt 10 being retained by appropriate structural means in a plane substantially co-extensive with the bottom of the channel. Batteries are propelled forward by the conveyor as they are transferred into this track from the conveyor belt in a continuous line and are caused to continue their forward movement by the force of other batteries urged against them by continued conveyor movement. However, when an alternate conveyor means is utilized, an individual battery cell 15 can be moved along the entire length of the track without the necessity of additional battery cells in abutting relationship. Interior wall surfaces 18 of the channel 16 assist in maintaining the proper orientation of the batteries as they travel along the track. This channel 16 may extend any desirable distance rearward (to the right in the illustrations) or utilize other chute means (not shown) in conjunction with it, to accept and guide any desirable number of batteries. It will also be apparent that the channel 16, and other structure hereinafter described, may be adapted to accept the batteries in horizontal orientations so that they may be rolled therethrough.

Figure 2:
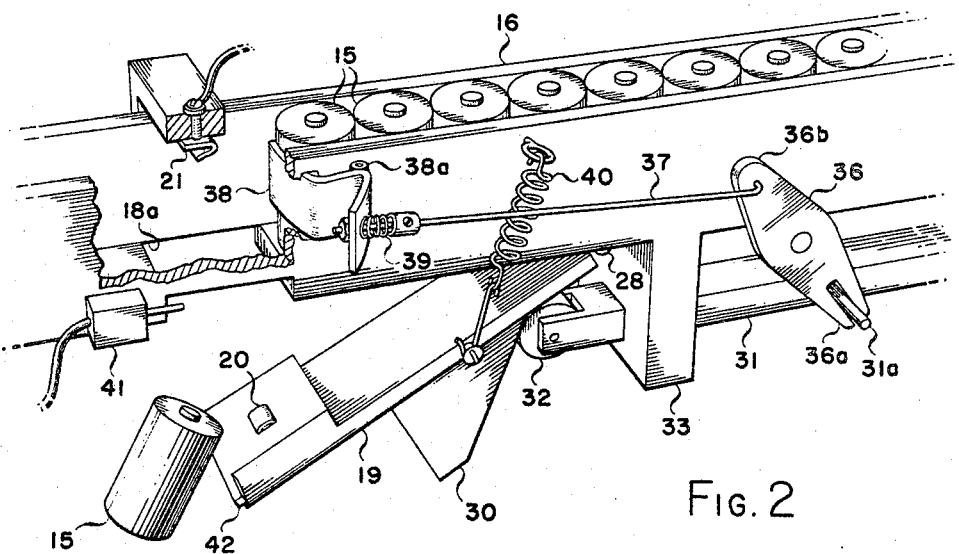
FIGURE 2 is an enlarged partial view of FIGURE 1, more specifically illustrating the battery testing and sorting mechanism.

The bottom of the channel guide 16 includes an opening 18a which is normally bridged by a conventionally hinged trap door 19 (FIGURE 2) which is a part of the electrical testing and sorting station. Projecting through the trap door 19 and adapted to make forcible contact with the negative terminal of any battery cell undergoing test is a wiper contact 20. In vertical alignment and co-operating with the wiper contact 20 is a second wiper contact 21 positioned by an appropriate structure to engage the positive terminal of the battery once the battery has reached the testing station. Wiper contacts 20 and 21 are spacially separated from one another and are connected in series in a circuit which includes an electromagnetic solenoid 23 which is energized when an electrical circuit is completed by the presence of a battery between and in contact with the pair of wiper contacts. A potentiometer 24 which is adjustable to predeterminable voltage settings is included in the circuit between the contacts and the solenoid 23 so as to influence energization of the solenoid in accordance with that setting. Hence, only those battery cells having a voltage potential meeting the potentiometer setting will complete the circuit and cause the solenoid to be energized.

Connected for operation by the solenoid 23 is a switch 25 which, in turn, controls a circuit 26 for activating a release mechanism solenoid 27. The solenoid circuit 26 includes an appropriate connection with a suitable line voltage source 43.

If desired, in order to further simplify the illustrated circuit in accordance with the foregoing description and appended claims, the solenoid 23 can be connected either directly or through appropriate linkage to the trap door 19. When the solenoid 23 is connected to the trap door 19, the switch 25, circuit 26, release mechanism solenoid 27 and line voltage source 43 can be eliminated.

During an electrical test procedure, the battery cell rests upon the trap door 19 which bridges the opening 18a in the guide track to prevent the battery cell from falling therethrough. The trap door, which is connected to the underside of the channel guide by means of hinge 28, also includes an angular cam 30 which extends downwardly from the rearward end of the door.

The door 19 is normally maintained within the guide opening 18a by means of a lock bar 31 which includes a cam follower element 32 on one end thereof abutting the cam 30, thereby retaining the trap door in the proper position to receive the series of battery cells. The lock bar 31 is supported in position by forward and rearward guide members 33 and 33a, respectively, and its rearward end is operatably connected to the solenoid 27, the solenoid being oriented such that its energization causes the lock bar to move rearward away from the trap door 19. A compression spring 34 is retained upon the lock bar 31 between the support member 33a and a detent 35 so as to continuously urge the lock bar 31 in a forward direction, i.e. to the left in the illustrations. Therefore, de-energizing the solenoid permits the compression spring to expand, moving the locking bar toward and into engagement with the trap door 19. The trap door is thereby maintained in a normally closed position.

A lever 36 is pivotally attached intermediate of its ends to the underside of the channel guide and one of its ends 36a is slotted to receive a pin 31a extending from a side of the lock bar 31 so that rectilinear movement of the locking bar is translated into rotary movement of the lever. An opposite end 36b of the lever 36 is connected in a pivoted relationship to a rod 37, which is connected, in turn, to a battery blocking member 38. This battery blocking member 38 is pivoted to a side of the channel 16 by a hinge 38a. Rotation of the blocking member about the hinge 38a moves one end of the blocking member into and out of the path of the series of batteries in such a manner that the block interferes with the progress of the series of batteries on the channel guide track during a sorting procedure, the block being removed from interference with the travel of the series of batteries after the sorting procedure has been completed. It does nothing, however, to interfere with the battery already positioned in the test region. A spring-loaded connection 39 is also provided between the rod 37 and the blocking member 38 to permit a modest flexibility in blocking member movement.

Rotary movement of the lever 36 is caused responsive to rectilinear movement of the locking bar. The blocking member 38 is configured so that it need be rotated only approximately 20 degrees to remove the block from interference with the movement of the battery cell series.

If the battery cell being tested has a charge with sufficient voltage to actuate the electromagnetic solenoid 23 as determined by the potentiometer 24, the locking bar is moved to its retracted position and the weight of the battery cell causes the trap door to open. The battery drops under force of gravity through the guide opening or chute 18a created by the removal of the trap and into a suitable hopper (not shown). The batteries so separated are reusable and they are ultimately returned to storage for reissuing to users. Batteries having a voltage charge below the desired level as set by the potentiometer, pass through the testing station on the trap door 19 without energizing the lock bar releasing mechanism. A suitable bin (not shown) is also provided for their collection. These batteries are unusable and are ultimately disposed of.

Figure 3:
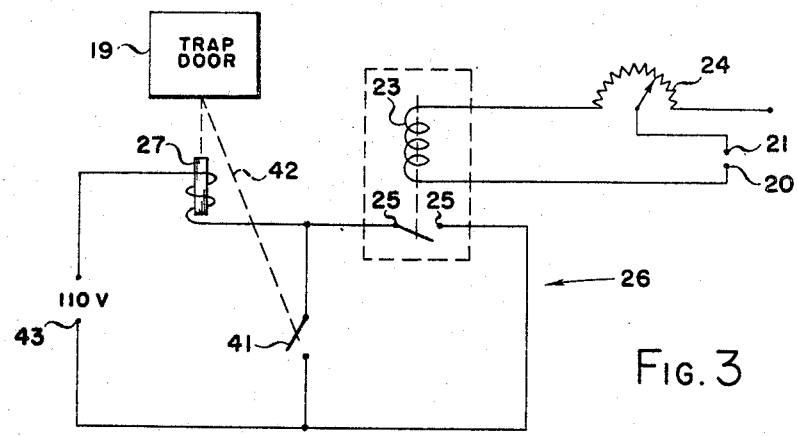
FIGURE 3 is an electrical schematic representation of the circuit for controlling the FIGURE 1 apparatus.

After a battery cell has tested as good and has dropped through the guide opening 18a, a tension spring 40 connected to the channel 16 and to the trap door 19 biases the trap to close the guide opening 18a so that the upper surface of the door 19 is in position to receive and test the next battery cell in the series. Since the opening of the trap door causes the wiper contacts to be disengaged from the cell and the electromagnet energizing circuit is thereby broken, a holding circuit (FIGURE 3) for the solenoid 27 is provided to insure that the solenoid will remain energized while the battery is dropping through the opening. The holding circuit includes a switch 41 which is actuatable by a striker bar 42 carried on the end of the trap door 19 adjacent its free end. The closure of switch 41 insures a supply of current to the solenoid 27 to maintain the locking bar 31 in its rearward position out of engagement with the trap door 19 while the cell is being dropped. The return of the trap to the normally closed position by the spring 40 causes the switch 41 to open and thereby to de-energize the solenoid 27 so that the lock bar cam element 32 is permitted to return to its forward position against the cam 30, securing the trap door 19 in its closed condition.

In an operation sequence of the invention, a series of batteries 15 are placed in side-by-side alignment in the channel guide 16 so as to be received by the conveyor belt 10 in an upright position (or horizontal for rolling when the structure of the invention is so constructed). Movement of the conveyor belt in the direction of arrow 14 moves the batteries into the testing region of the guide means past the block 38 which is normally positioned out of the path of the travel of the battery cells and does not impede their travel.

As a battery passes between the separated wiper contacts 20 and 21 at the testing station, the positive and negative poles of the battery are engaged. If sufficient voltage remains in the battery to meet the setting of the potentiometer 24, the circuit is completed to supply current and energize the electromagnet 23. This closes the switch 25 and causes the solenoid 27 to be energized and causes the locking bar 31 to move against and compress the spring 34, permitting the trap door 19 to pivot about its hinge 28 responsive to the weight of the battery cell.

Retraction of the locking bar 31 also causes the lever 36 to pivot, thereby moving the rod 37 to the left and pivoting the block 38 into a position in front of the next battery in the series and preventing it from moving into the test position.

As the trap door 19 pivots downward to permit the passage of the tested battery, the striker 42 contacts and closes the switch 41. Once the battery has cleared the door, the spring 40 returns the door and the contact 20 which it carries to a closed position. The upward movement of the trap door causes the striker 42 to open switch 41, de-energizing of the solenoid 27. The compression spring 34 expands to return the locking bar to its normal position and the element 32 engages with the cam follower 30 to hold the trap door 19 within the guide opening 18a. The movement of the lock bar 31 causes the lever 36 to pivot in a counterclockwise direction, removing the block 38 from the battery travel path. The next battery then moves into the testing station and the apparatus is ready for the next cycle.

In the event that a battery cell undergoing tests lacks a voltage charge sufficient to energize the electromagnet circuit, the battery is merely forced out of engagement with the wiping contacts 20 and 21 by the row of moving batteries which follow it and the next battery cell moves into the test position. Therefore, the battery cells to be discarded are moved along the track of the channel guide to a disposal hopper.

In summary, the apparatus of the present invention is extremely simple, avoiding the use of complex mechanisms. Its utilization in testing and separating for re-use those batteries having a useful residual life has resulted in great cost savings. The fact that both the testing and the sorting of the batteries takes place at the testing station, thereby eliminating the need for a separate mechanism for removal of unusable batteries is of significance in this respect.

While particular embodiments of the present invention have been shown and described, it will be obvious to those skilled in the art that changes and modifications may be made without departing from this invention in its broader aspects.

I claim:
1. Apparatus for testing and sorting a plurality of battery cells, the combination comprising:
   an elongated guide having a rectilinear path for accommodating battery cell travel and being adapted to receive and support the plurality of battery cells in an in-line relationship;
   a trap door hingedly connected to said guide and arranged in said path of the moving battery cells to individually, releasably, and sequentially support each of the battery cells;
   a pair of wiper contacts disposed adjacent said trap door and arranged to engage the opposite ends of each battery cell as the battery cells move over said trap door;
   an electromagnet connected in series with said wiper contacts and having a normally open switch operable to close upon the energizing of said electromagnet;
   a variable resistance coupled in series with said electromagnet and said wiper contacts to establish the energization level of said electromagnet in conjunction with the voltage level of the battery cell engaged by said wiper contacts;
   a trap door release mechanism movably supported on said guide and having one end thereof cammed to said trap door; and
   actuator means connected to said release mechanism to move said release mechanism, thereby opening and closing said trap door.

2. The invention as defined in claim 1 including an electrical holding circuit operable to energize said solenoid upon the disengagement of said wiper contacts from the battery cells.

3. The invention as defined in claim 2 wherein said holding circuit includes a striker bar carried on said trap door and wherein an electrical switch is mounted upon said guide adjacent said trap door and adapted to be alternately closed and opened by said striker bar to alternately energize and de-energize said solenoid.

4. The invention as defined in claim 1, further including a battery blocking member pivotally mounted on said guide and being responsive to movement of said release mechanism to be selectively disposed between batteries and prevent further movement of the battery cells not in testing position when said electromagnet is energized.

5. An apparatus for testing and sorting battery cells comprising:
   a guide means to receive and support the battery cells;
   a sorting means mounted adjacent said guide means and adapted to separate the battery cells dependent upon their voltage level; and
   a testing means mounted adjacent said sorting means and electrically connectable thereto through a battery cell, said testing means adapted to determine the voltage level of said battery cell and having a potentiometer to predetermine the voltage level at which said sorting means will be activated by said testing means in response to said battery cell's voltage level.

6. The apparatus in accordance with claim 5 wherein said guide means is rectilinear and has a discontinuity adjacent one end thereof.

7. The apparatus in accordance with claim 6 wherein said sorting means is adapted to bridge the discontinuity in said guide means.

8. The apparatus in accordance with claim 7 wherein said battery cell is tested by said testing means when abutting said discontinuity bridging portion of said sorting means.

9. An apparatus in accordance with claim 8 wherein said sorting means is adapted to open the discontinuity in said guide means in response to a predetermined voltage level in said battery cell being tested.

10. An apparatus in accordance with claim 5 wherein said sorting means comprises a solenoid-operated release mechanism, said release mechanism being actuated by said testing means in response to a predetermined voltage level supplied by the individual battery cell being tested.

11. An apparatus in accordance with claim 10 wherein said testing means comprises, in series, a solenoid, a potentiometer, and a pair of wiper contacts;
   said wiper contacts being spaced apart and arranged in the path of the battery cells to slidably engage the opposite pole terminals of the battery cell as it is supported by said sorting mechanism; and
   wherein said release mechanism is actuated by said solenoid in response to a predetermined voltage supplied by the individual battery cell being tested, as set by said potentiometer.

12. The apparatus for testing and sorting batteries according to claim 11 wherein:
   battery conveyor means is provided in said battery guide means and said guide defines a rectilinear path for the travel of battery cells in alignment with said conveyor to receive and support the plurality of battery cells in in-line relationship;
   a trap door forming a portion of said battery sorting means is adapted to bridge a discontinuity in said guide and arranged in the path of the moving battery cells to releasably support each battery cell sequentially; and
   one of said wiper contacts being disposed in said trap door, the other said wiper contact being retained in spaced relation therefrom, said wiper contacts adapted to sequentially engage each of the battery cells as that battery cell passes said trap door, said trap door being openable responsive to the weight of a single battery cell.

13. An apparatus in accordance with claim 5 further comprising an electrical holding circuit operable to reactivate said sorting means through a separate power source when said battery cell is removed from said testing means during separation.

14. An apparatus in accordance with claim 5 further comprising means responsive to said sorting means for restricting the movement of other battery cells during the testing and sorting of a particular battery cell.

References Cited

UNITED STATES PATENTS

| | | | |
|---|---|---|---|
| 1,832,948 | 11/1931 | Schmidt | 209—81 |
| 3,215,241 | 11/1965 | Haefele et al. | 324—29.5 X |

ALLEN N. KNOWLES, Primary Examiner

U.S. Cl. X.R.

209—74, 81